(12) United States Patent
Johnstone (10) Patent No.: US 8,844,206 B2
(45) Date of Patent: Sep. 30, 2014

(54) MOBILE TRUCK-MOUNTED PERFORMANCE STAGE ON A HYDRAULIC LIFT

(76) Inventor: Michael James Johnstone, Vacaville, CA (US)

( * ) Notice: Subject to any disclaimer, the term of this patent is extended or adjusted under 35 U.S.C. 154(b) by 105 days.

(21) Appl. No.: 13/620,937

(22) Filed: Sep. 15, 2012

(65) Prior Publication Data

US 2013/0067829 A1 Mar. 21, 2013

Related U.S. Application Data

(60) Provisional application No. 61/535,050, filed on Sep. 15, 2011.

(51) Int. Cl.
*E04H 3/26* (2006.01)
*B60P 3/025* (2006.01)
*B66F 11/04* (2006.01)
*B60P 1/02* (2006.01)

(52) U.S. Cl.
CPC ............... *E04H 3/26* (2013.01); *B60P 3/0252* (2013.01); *B66F 11/042* (2013.01); *B60P 1/02* (2013.01)
USPC ........................... 52/7; 52/6; 52/79.5; 52/143

(58) Field of Classification Search
CPC ......... E04H 3/10; E04H 3/28; E04B 1/34336; E04B 1/3444
USPC .................. 52/6, 7, 65, 66, 68, 71, 79.5, 143; 296/26.12, 26.14, 158
See application file for complete search history.

(56) References Cited

U.S. PATENT DOCUMENTS

| 2,647,022 | A | * | 7/1953 | Smid et al. ................... 182/13 |
| 2,978,754 | A | * | 4/1961 | Wilson ....................... 108/170 |
| 3,118,187 | A | * | 1/1964 | Alimanestiano ................. 52/34 |
| 3,181,203 | A | * | 5/1965 | Wenger ............................ 52/6 |
| 3,217,366 | A | * | 11/1965 | Wenger ............................ 52/6 |
| 3,245,180 | A | * | 4/1966 | Bules et al. .................... 52/116 |
| 3,258,884 | A | * | 7/1966 | Wenger ............................ 52/6 |
| 4,026,076 | A | * | 5/1977 | Analetto ........................... 52/6 |
| 4,232,488 | A | * | 11/1980 | Hanley ............................ 52/7 |
| 5,152,109 | A | * | 10/1992 | Boers ........................... 52/143 |
| 5,280,985 | A | * | 1/1994 | Morris ....................... 296/26.15 |
| 5,327,698 | A | * | 7/1994 | Uhl ................................ 52/68 |
| 5,375,899 | A | * | 12/1994 | Wright ......................... 296/21 |
| 5,398,463 | A | * | 3/1995 | Wright ............................ 52/7 |
| 5,400,551 | A | * | 3/1995 | Uhl ................................ 52/68 |
| 5,546,709 | A | * | 8/1996 | Decker et al. .................. 52/66 |
| 5,716,090 | A | * | 2/1998 | Chang et al. ............... 296/26.01 |
| 5,947,502 | A | * | 9/1999 | Kammerzell et al. ........ 280/442 |

(Continued)

*Primary Examiner* — Jeanette E Chapman
*Assistant Examiner* — James Buckle, Jr.

(57) ABSTRACT

The present invention is a mobile performance stage mounted on a hydraulic lift truck for enabling a quick and easy performance setup in a location that does not already have a dedicated stage. The lift truck supports a hydraulic lift mechanism, which supports the stage and enables the stage to be elevated to a desired height. The stage is a rectangular cuboid resembling a cargo hold of most cargo trucks, with doors at each of the four lateral sides that open to reveal a performance area. The perimeter of the stage is outlined by short sidewalls except for the side of the stage between the performers and the audience. The stage comprises trusses outlining the vertical sides and roof of the stage for mounting lighting and other performance equipment. The stage also comprises a digital display, a safety railing, and a utility platform.

19 Claims, 6 Drawing Sheets

(56) References Cited

U.S. PATENT DOCUMENTS

| | | | |
|---|---|---|---|
| 6,393,769 B1 * | 5/2002 | Mertik et al. | 52/7 |
| 6,499,258 B1 * | 12/2002 | Borglum | 52/9 |
| 2012/0272584 A1 * | 11/2012 | Bilsen et al. | 52/7 |
| 2012/0272585 A1 * | 11/2012 | Bilsen et al. | 52/7 |

\* cited by examiner

DETAIL A

MOBILE TRUCK-MOUNTED PERFORMANCE STAGE ON A HYDRAULIC LIFT

The current application claims a priority to the U.S. Provisional Patent application Ser. No. 61/535,050 filed on Sep. 15, 2011.

FIELD OF THE INVENTION

The present invention relates generally to an apparatus for stages and a method of operation thereof. More specifically, the present invention is a mobile, truck-mounted stage on a hydraulic lift to be used in performances, public addresses, and audio-visual presentations, and a method for operating the said stage.

BACKGROUND OF THE INVENTION

A performance is generally defined as an event in which a performer or group of performers behave in a particular way for another group of people, the audience. Often, a performance is for the benefit by way of entertainment of the audience. Sometimes the dividing line between the performer and the audience may become blurred, such as in participatory theatre, where the performance also involves audience members. Many types of performances may take place, such as a musical concert, recital or competition, plays, ballets, circus acts, live art, magic shows, and public address announcements.

Performances generally require a designated area for the performers to occupy, known as a stage, which is usually elevated a distance above ground level in order to facilitate the attention of the audience being focused on the performance in addition to everyone in the audience being able to get a clear view of the performance. In more elaborate venues, such as a concert hall, the stage is fairly large and well-lit, and the seating is tiered and comprises multiple floors so that each row of audience members is slightly more elevated so that their view is not blocked by the row of people in front of them.

Sometimes it is desired to have a performance in a location that does not already have a permanent stage set up, such as an open air concert in a park. In such cases, a temporary stage must be constructed. This is often a lengthy, labor intensive process involving many workers and costly equipment. In addition, depending on the type of performance and the number of people in attendance, a temporary stage may not provide adequate sight lines for the entire audience.

It is therefore an object of the present invention to provide a mobile, truck-mounted stage with a hydraulic lifting mechanism that is unique, novel, use-case presented, and utilizes pre-existing, pre-defined design components to make the setup and tear down process for a performance involving a temporary stage much quicker, easier, and more cost effective.

DETAIL DESCRIPTIONS OF THE INVENTION

All illustrations of the drawings are for the purpose of describing selected versions of the present invention and are not intended to limit the scope of the present invention.

Referring to FIGS. 1-5, the present invention is a mobile, truck-mounted performance stage 2 with a hydraulic lifting mechanism 10 to raise and lower the stage 2. The present invention is unique, novel, use-case presented, and utilizes pre-existing, pre-defined design components. The lift truck 1 comprises a lifting mechanism 10, a truck frame 12, a lift support frame 13, a plurality of stabilizing feet 14, and typical means for driving a truck including, but not limited to, wheels, a driveshaft, a steering mechanism, an engine, and any other typically necessary components for the operation of a truck. In the preferred embodiment of the present invention, the stage 2 comprises a stage platform 21, a roof 22, a plurality of sidewalls 20, a plurality of supports 26, a plurality of doors 15, a plurality of door operation mechanisms 300, a plurality of lighting trusses 16, a digital display 39, a safety railing 41, and a utility platform 42. In an alternate embodiment of the present invention, the stage 2 is not directly connected to the truck, but is mounted on a trailer comprising a hydraulic lifting mechanism 10 so that the stage 2 may be moved by attaching the trailer to a tractor unit, placed in the desired position, and detached from the tractor unit so that the tractor unit may be driven out of sight of the audience for an improved aesthetic appeal.

The plurality of stabilizing feet 14 is positioned under the truck frame 12 and is connected to the truck frame 12 in a manner typical of trucks that utilize stabilizing feet. The plurality of stabilizing feet 14 may use any appropriate method for engaging the ground, such as, but not limited to, a hydraulic mechanism, a pneumatic mechanism, a mechanism such as a leadscrew or a rack and pinion system, or any combination of appropriate mechanisms. The truck frame 12 comprises components necessary to support the previously disclosed typically necessary components for the operation of a truck. The truck frame 12 also supports the lift support frame 13, which is a frame, platform or other structural element or combination of structural elements providing the support necessary to implement the lifting mechanism 10. In one embodiment of the present invention, the truck frame 12 and the lift support frame 13 are one and the same. The lift support frame 13 may be positioned above the truck frame 12, or the lift support frame 13 and the truck frame 12 may occupy a similar volume in space. The lifting mechanism 10 is positioned between the lift support frame 13 and the stage platform 21.

Figure 3:
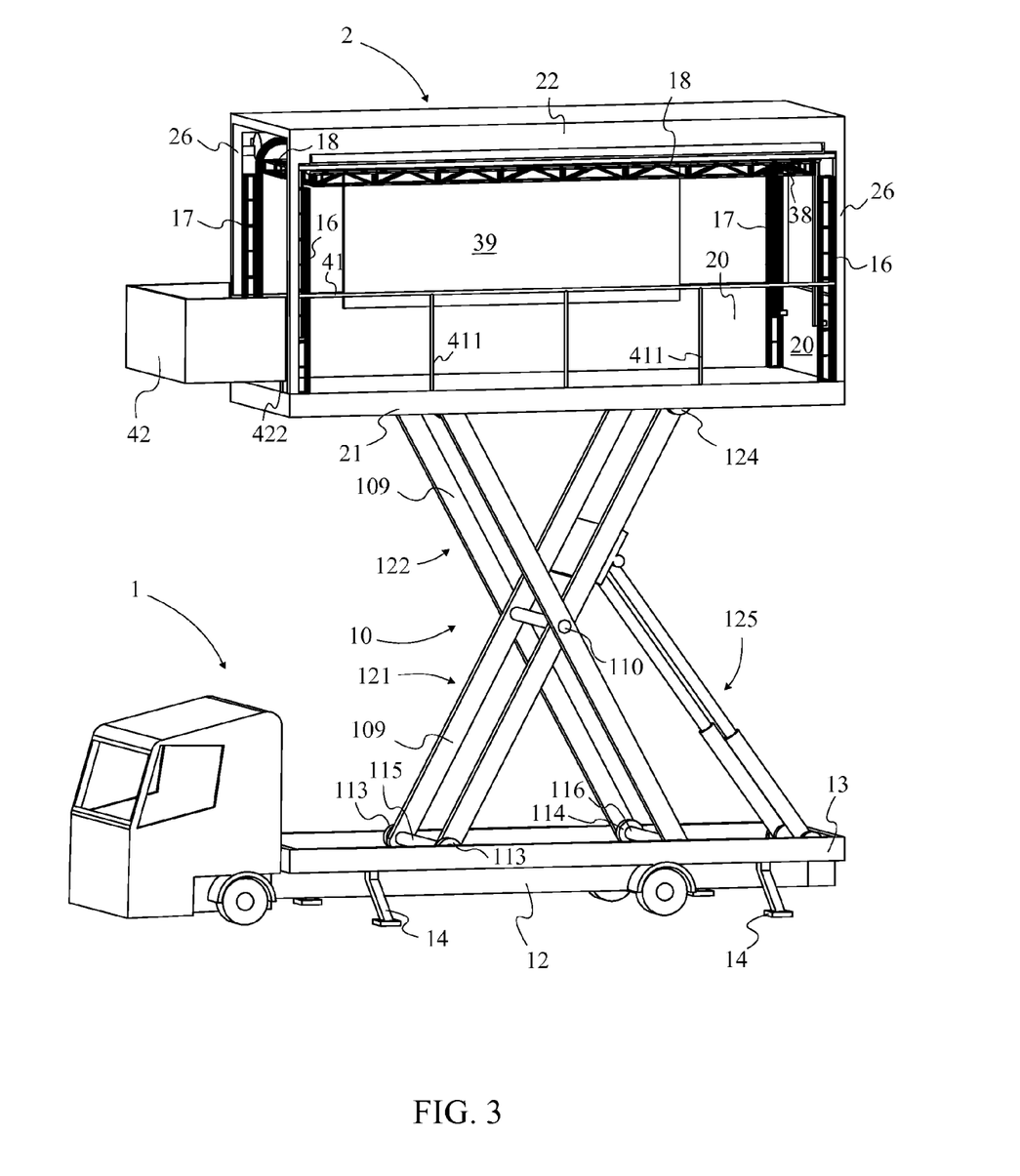
FIG. 3 is a front raised perspective view of the present invention with a flat roof, with a connected utility platform, in the raised position with all the doors open.
Figure 4:
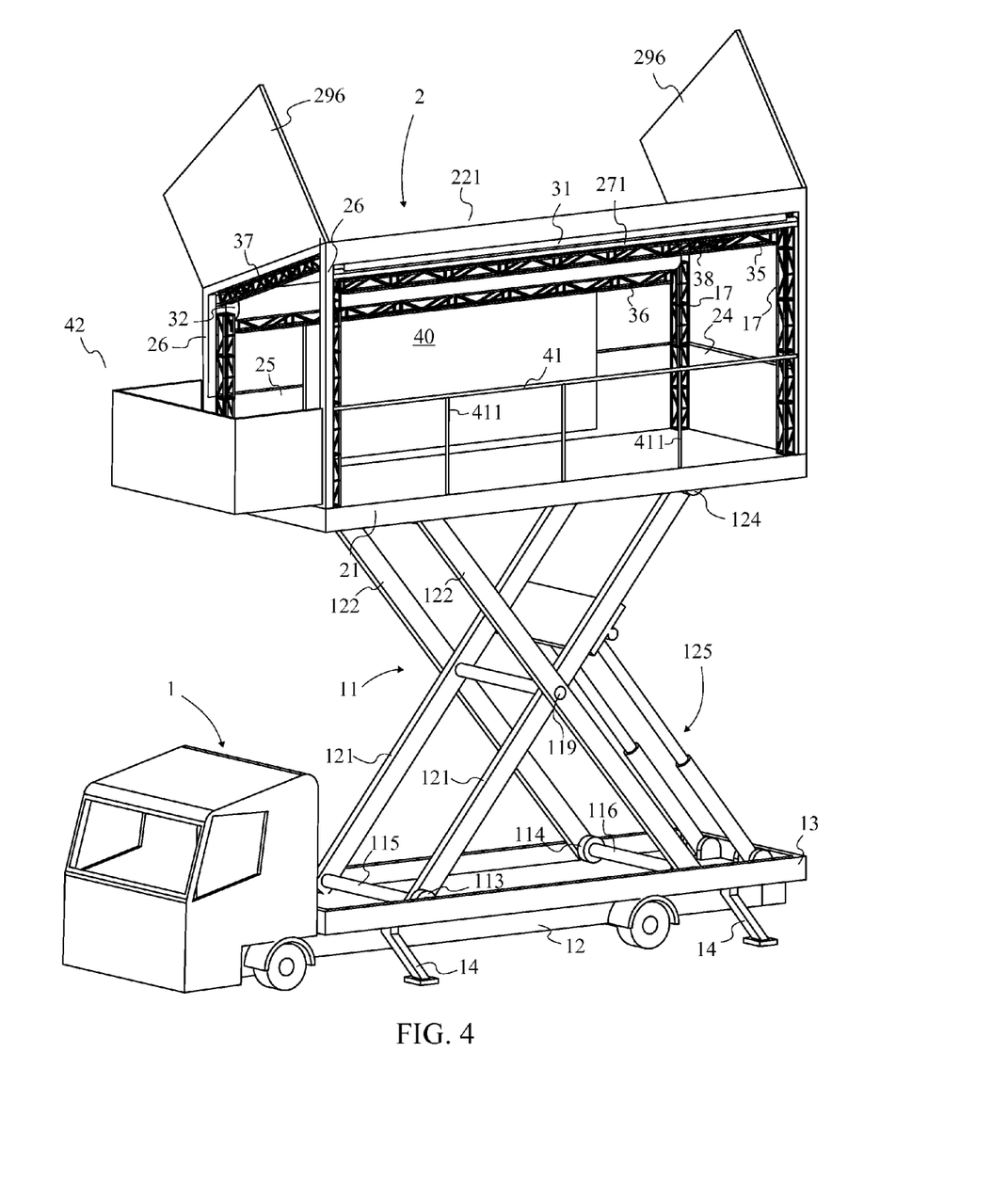
FIG. 4 is a front raised perspective view of the present invention with a slanted roof, with a connected utility platform, in the raised position with all the doors open.
Figure 5:
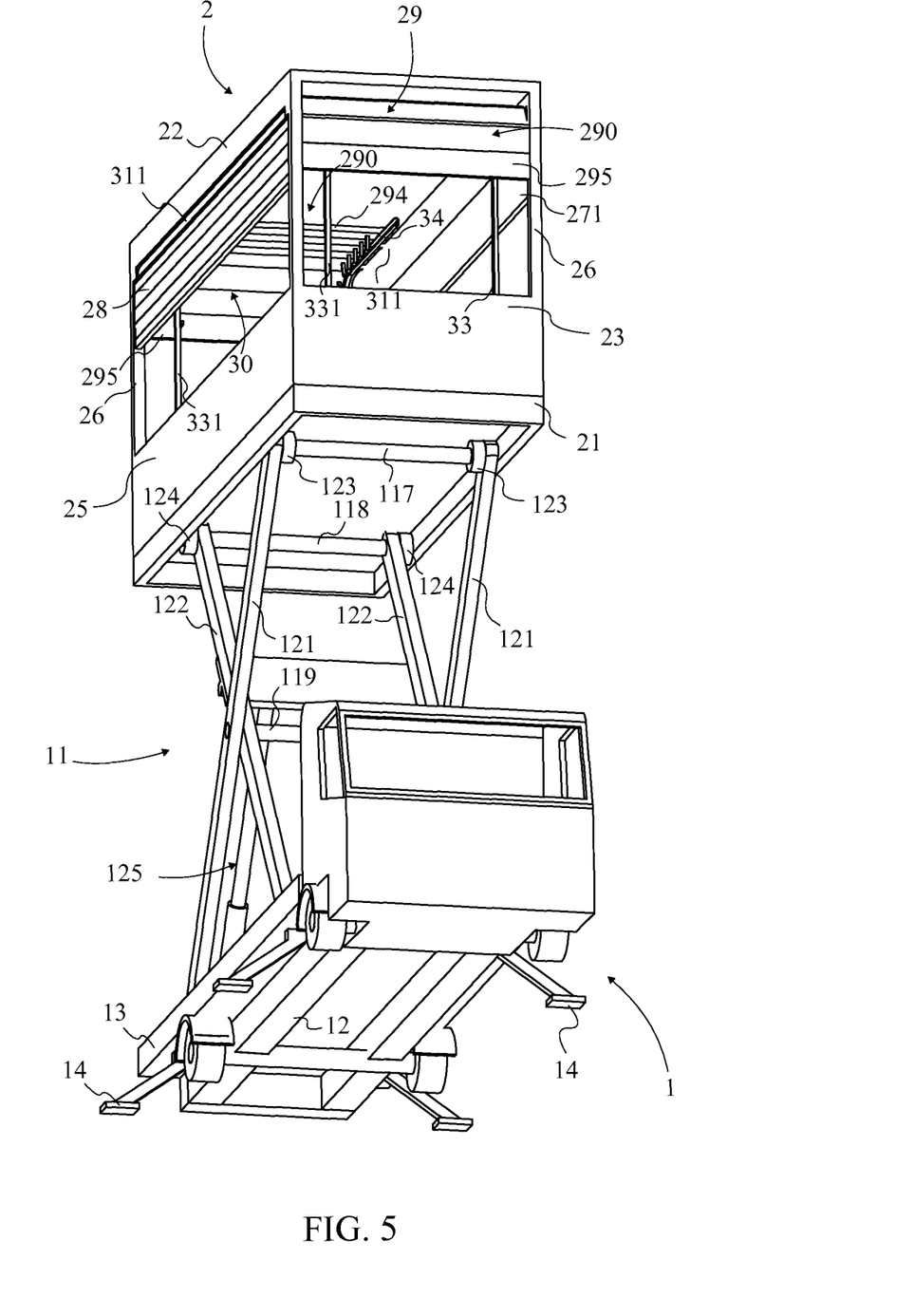
FIG. 5 is a rear lowered perspective view of the present invention with a flat roof, with no connected utility platform, in the raised position, with the doors partially open, with no lighting trusses or video display system displayed for the purpose of clarity.

Referring to FIGS. 3-5, in the preferred embodiment of the present invention, the lifting mechanism 10 comprises a hydraulic scissor lift 11. The hydraulic scissor lift 11 moves vertically by utilizing linked, folding supports in a criss-cross "X" pattern, known as a pantograph or scissor mechanism. The preferred embodiment of the present invention utilizes a single hydraulic scissor lift 11, comprising a plurality of lift arms 109, a plurality of lift axles 110, and a hydraulic extension mechanism 125. The plurality of lift arms 109 comprises four lift arms and the plurality of lift axles 110 comprises five lift axles. The plurality of lift arms comprises a first set of parallel lift arms 121 and a second set of parallel lift arms 122. Each of the plurality of lift axles 110 is cylindrical. As can be seen in FIGS. 4 and 5, the plurality of lift axles 110 comprises a first lower lift axle 115, a second lower lift axle 116, a first upper lift axle 117, a second upper lift axle 118, and a midpoint lift axle 119. Each of the plurality of lift axles 110 is parallel to the ground and perpendicular to the length of the lift truck 1. The first lower lift axle 115 and the second lower lift axle 116 are supported by the lift support frame 13. The first upper lift axle 117 and the second upper lift axle 118 support the stage platform 21. The first lower lift axle 115 is positioned horizontally opposite the second lower lift axle 116 along the length of the lift truck 1. The second upper lift axle 118 is positioned vertically above the second lower lift axle 116 and the first upper lift axle 117 is positioned vertically above the first lower lift axle 115. Each of the plurality of lift axles 110 is allowed to rotate about its cylindrical axis.

The first lower lift axle 115 comprises a first set of lower lift wheels 113, the second lower lift axle 116 comprises a second set of lower lift wheels 114, the first upper lift axle 117 comprises a first set of upper lift wheels 123, and the second lift axle 118 comprises a second set of upper lift wheels 124. The first set of lower lift wheels 113 of the first lower lift axle 115 and the second set of lower lift wheels 114 of the second lower lift axle 116 rest on the lift support frame 13. The first set of upper lift wheels 123 of the first upper lift axle 117 and the second set of upper lift wheels 124 of the second lift axle 118 support the stage platform 21. Each of the sets of lift wheels are rotatably connected and concentrically positioned with their respective lift axles.

In one embodiment of the present invention, each of the sets of lift wheels rests in a set of wheel tracks. A first set of wheel tracks is oriented parallel to the lift support frame 13 and is connected to or is part of the lift support frame 13. A second set of wheel tracks is oriented parallel to and is connected to or is part of the bottom side of the stage platform 21.

Each of the parallel lift arms comprised in the first set of parallel lift arms 121 is rotatably connected to the first lower lift axle 115 on one end and to the second upper lift axle 118 on the other end. Each of the parallel lift arms comprised in the second set of parallel lift arms 122 is rotatably connected to the first upper lift axle 117 on one end and to the second lower lift axle 116 on the other end, forming an X shape with the first set of parallel lift arms 121. The first set of parallel lift arms 121 and the second set of parallel lift arm 122 are connected at their midpoints by the midpoint lift axle 119. The upward motion of the hydraulic scissor lift 11 is achieved by the application of a force to the lift arms by the hydraulic extension mechanism 125 that increases the angle between the lift arms and the horizontal, resulting in the top ends of the lift arms moving in a direction that has a vertical component. Having the lift axles 110 be able to translate relative to each other is necessary because the motion of the arms is rotational, resulting in movement in two dimensions instead of just one. The specific embodiment of the hydraulic scissor lift previously described is a preferred embodiment of the lifting mechanism. In alternate embodiments of the present invention, the hydraulic scissor lift 11 comprises alternate components or configuration, or the lifting mechanism 10 comprises a simple vertical hydraulic lift system, an articulated lift system, or another appropriate system that facilitates upward motion of the stage 2.

In the preferred embodiment of the invention, the stage 2 is rectangular and similar in shape and outer dimensions to the cargo hold of a typical cargo truck. Referring to FIGS. 3-5, the plurality of sidewalls 20 comprises a first sidewall 23, a second sidewall 24 and, a back sidewall 25. In the preferred embodiment of the invention, each of the plurality of sidewalls 20 is three feet high, connected to and oriented perpendicular to the stage platform 21. The outer face of each of the plurality of sidewalls 20, opposite the main inside portion of the stage platform 21, is preferably flush with the outer perimeter of the stage platform 21. The first sidewall 23 and the second sidewall 24 are positioned opposite and parallel to each other. The back sidewall 25 is perpendicularly connected to the first sidewall 23 and the second sidewall 24. The side of the stage platform 21 that does not comprise a sidewall may be referred to as the front side, because that is the side that the audience faces and is closest to when the invention is in use to facilitate a performance.

Figure 1:
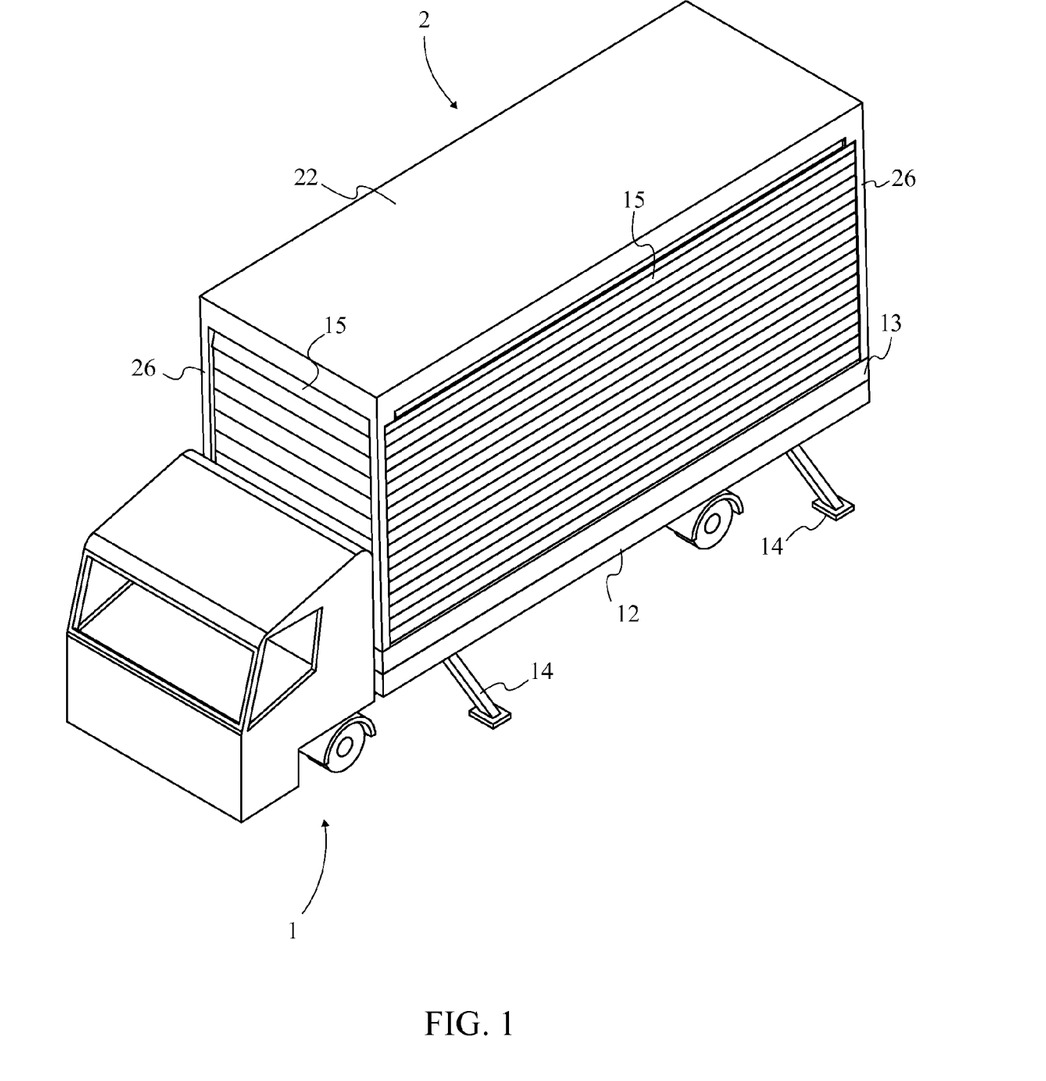
FIG. 1 is a front raised perspective view of the present invention with a flat roof, with no utility platform, in the lowered position with all the doors closed.
Figure 2:
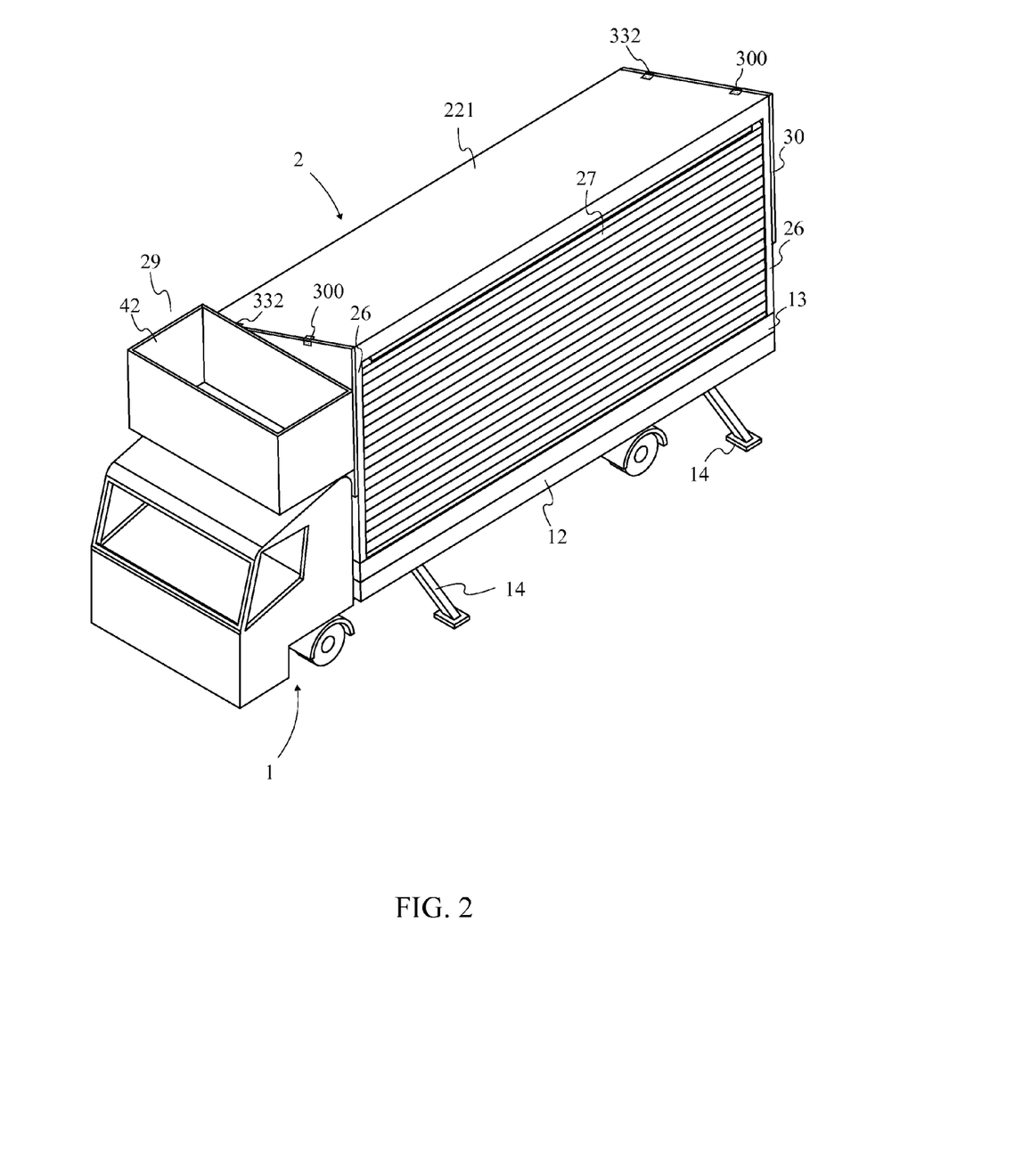
FIG. 2 is a front raised perspective view of the present invention with a slanted roof, with a connected utility platform, in the lowered position with all the doors closed.

In the preferred embodiment of the present invention, the plurality of supports 26 comprises four vertical supports, each at one corner of the stage platform 21. The tops of the plurality of sidewalls 20 are connected to the bottoms of each of the supports 26, and the tops of each of the supports 26 are connected to the roof 22. In one embodiment of the present invention, the roof 22 is flat. In another embodiment, the roof 22 comprises a slanted roof as can be seen in FIGS. 2 and 4. In another embodiment, the roof 22 is hinged at the back, and the front supports comprise an extending mechanism, which allows the roof 22 to be converted from a flat orientation to a slanted orientation.

Referring to FIGS. 1, 2, 4, 5 and 6, the plurality of doors 15 comprises a front door 27, a back door 28, a first side door 29 and a second side door 30. In alternate embodiments of the present invention, any of the plurality of doors 15 may be further subdivided into multiple door sections. For example, the front door 27 and/or the back door 28 may each comprise a plurality of door sections in a manner similar to beverage truck doors. The doors fill the empty space between the roof 22 and the plurality of sidewalls 20, and between the roof 22 and the stage platform 21, in the case of the front side, which does not have a sidewall. Each of the plurality of doors 15 comprises a door embodiment that accomplishes the goals of filling the empty space, being able to be opened and closed, and the components being compatible with the arrangement of the rest of the stage 2. In the preferred embodiment of the invention, the front door 27 and the back door 28 each comprise a roll-up door 271 that is made of many sectional pieces that are linked in series and able to be rolled up into a roll-up door holder 311 in a manner similar to a paper towel roll. When closed, the entirety or majority of the sectional pieces of the roll-up door 271 are concentrically held around a concentric support rod in the center of the roll-up door holder 311 that is attached to the sectional piece at the top of the roll-up door 271. The roll-up door holders 311 are positioned adjacent to the roof 22 adjacent to the perimeter of the roof 22 and parallel to the perimeter of the roof 22. In one embodiment of the present invention, the first side door 29 and the second side door 30 also comprise similar roll-up doors 271.

Figure 6:
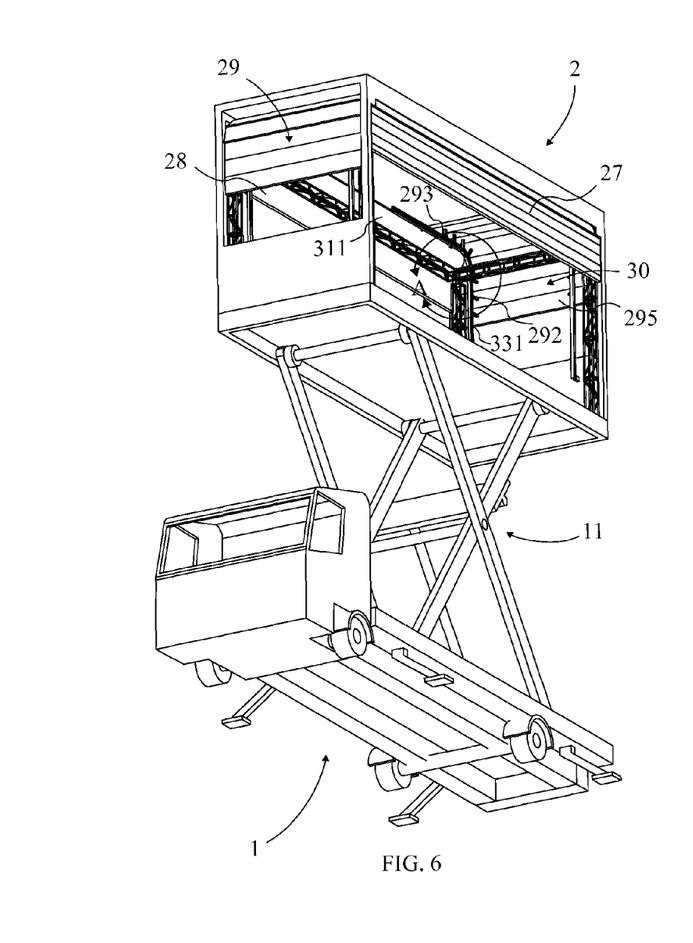
FIG. 6 is a front lowered perspective view of the present invention with a flat roof, with the doors partially open.
Figure 7:
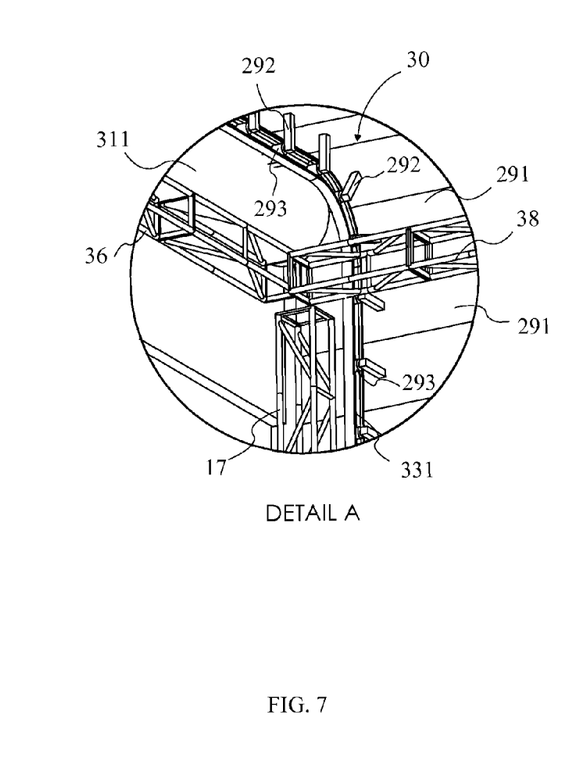
FIG. 7 is a detail view of FIG. 6 taken at the corner of the stage adjacent to the roof, back door and second side door for a better view of the second side door track and door wheels.

Referring to FIGS. 5-7, in another embodiment of the present invention with a flat roof 22, the first side door 29 and the second side door 30 comprise sectional door systems 290 similar to common garage doors. The sectional door systems 290 comprise a plurality of panel sections 291 arranged in series that are linked by hinges to the panel sections 291 on either side of each of the panel sections 291, except for the first panel section 294 and the last panel section 295, which are only adjacent to one panel section. The sectional door systems 290 also comprise at least one door track 331. As can be clearly seen in FIG. 7, each panel comprises at least one protrusion 292 that supports a door wheel 293 that is positioned within a door track, in order to allow the door to be moved along the track from its closed position to its open position. Preferably, the door tracks 331 are L shaped, with two perpendicular straight portions connected by a fillet or other curved portion. One of the portions of the track is perpendicular to the roof 22 and preferably connected to a support 26 and the other track portion is parallel to the roof 22. The door is opened by applying a force to the door in a direction tangent to the door track 331 the door is operatively connected to and guiding it along the track 331 until it is positioned fully out of the space between the roof 22 and the sidewall.

Referring to FIGS. 2 and 4, in another embodiment of the invention, the first side door 29 and the second side door 30 each comprise rigid hinge doors 296 or gull wing doors attached to the roof 22 that swing along the hinge axis to open and close. The hinge doors 296 may be connected by one or more hinges 332 to the roof 22, to a support 26, or to a sidewall. The embodiment with the slanted roof 221 preferably utilizes hinge doors. In one embodiment with the slanted roof 221, the side doors also may comprise roll up doors 271 or sectional door systems 290. In another embodiment, any of the doors may comprise a multi-section folding door.

A plurality of door operation mechanisms 300 comprises a front door operation mechanism 31, a back door operation mechanism 32, a first side door operation mechanism 33 and a second side door operation mechanism 34. In the preferred embodiment of the invention, the front door operation mechanism and the back door operation mechanism each comprise a roll-up door holder 311. In one embodiment of the present invention that comprises a flat roof 22, the first side door operation mechanism 33 and the second side door operation mechanism 34 each comprise one or more door tracks 331. In another embodiment of the present invention that comprises a flat roof 22, the first side door operation mechanism 33 and the second side door operation mechanism 34 each comprise a roll-up door holder 311. In another embodiment of the present invention that comprises a flat roof 22, the first side door operation mechanism 33 and the second side door operation mechanism 34 each comprise a plurality of hinges 332. In alternate embodiments comprising a slanted roof, the first side door operation mechanism 33 and the second side door operation mechanism 34 may each comprise a roll-up door holder 311, a plurality of door tracks 331, or a plurality of hinges 332.

Each of the plurality of door operation mechanisms 300 may be automatic and motorized, or each door may require manual operation, or certain doors may have motorized operating mechanisms while other doors have manual operating mechanisms. In the sectional door embodiment, the operating mechanism may be a motor connected by some means to one end of the door that forces the door along its door track. For the roll-up doors, the operating mechanism may be a motor that rotates the concentric support rod the door rolls up onto, or it may be a belt chain that allows a person to rotate the support rod manually. For the hinge doors, the door operating mechanism may simply be the hinges themselves, or a motorized, hydraulic or pneumatic mechanism that applies a force to the door to open the door.

Referring to FIG. 3, the plurality of lighting trusses 16 comprises a plurality of side trusses 17 and a plurality of top trusses 18. The plurality of lighting trusses 16 comprise typical truss arrangements and configurations commonly used to support stage lighting, speakers or other audio-visual performance equipment. In the preferred embodiment of the present invention, the trusses are made of an appropriate material such as, but not limited to, aluminum, and have a triangular cross section. In an alternate embodiment, the trusses have a square or rectangular cross section.

Referring to FIGS. 3-4, in the preferred embodiment of the present invention, each of the plurality of side trusses 17 is oriented vertically and is positioned adjacent to a support 26. Preferably, the side trusses 17 are positioned adjacent to or connected to both the stage platform 21 and to the roof 22 on opposite ends of the side trusses 17. Each of the plurality of top trusses 18 is positioned adjacent to or connected to the roof 22. The plurality of top trusses 18 comprises a front truss 35, a back truss 36, a first side truss 37, and a second side truss 38. The front truss 35 and the back truss 36 are positioned opposite each other and are oriented parallel to the back sidewall 25. The first side truss 37 and the second side truss 38 are positioned opposite each other and are oriented parallel to the first sidewall 23 and parallel to the second sidewall 24. The trusses are generally arranged to resemble an outline of the supports 26 and the roof 22.

Referring to FIGS. 3-4, in the preferred embodiment of the invention, the digital display 39 comprises a video display system 40. The video display system 40 is preferably oriented parallel to the back sidewall 25, facing the audience, and positioned near the back truss 36. The video display system 40 may be detachably mounted to the back truss 36 or the video display system 40 may hang from supports connected to the roof 22, supports 26, or stage platform 21, or the video display system may be mounted or attached using another desired method. In alternate embodiments of the present invention, the video display system 40 is positioned adjacent to the front side of the stage 2 and oriented to face the performers. In another embodiment of the present invention, the side doors open horizontally to be parallel with the back sidewall 25, revealing a video display system 40 to the audience on the inside of each side door. In other embodiments of the present invention, the stage 2 comprises multiple video display systems 40 in various positions and orientations.

As can be seen in FIGS. 3-4, in the preferred embodiment of the present invention, the safety railing 41 is a thin, steel railing with a plurality of railing posts 411 for installation into vertical holes in the stage platform 21. The safety railing 41 is preferably positioned at or near the front side of the stage 2 or the front door 27. The stage platform 21 comprises a plurality of holes equal in number and spacing to the plurality of railing posts 411 into which the railing posts 411 are inserted in order to manually install or remove the safety railing 41. The width of the safety railing 41 traverses the same length of the front side as the front door 27. The safety railing 41 is preferably a thin, steel railing approximately 3.5 feet in height, but may be made of other suitable materials and have different heights if desired.

As can be seen in FIGS. 2-4, in the preferred embodiment of the invention, the utility platform 42 is preferably positioned outside a sidewall, opposite the main portion of the stage platform 21. The utility platform 42 may serve as a technical support platform or it may serve to expand the functional stage surface, or both. Preferably, the walls of the utility platform 42 comprise a first section of 12 inch kickboard and a second section of 30 inch safety railing, for a total height of 42 inches. The utility platform 42 has a plurality of utility platform wheels that are positioned inside a plurality of utility platform tracks 422 in order that the utility platform 42 may be adjustably positioned. In one embodiment of the present invention, the utility platform tracks 422 traverse from inside the stage area, below the roof 22 to outside the stage area. In another embodiment of the present invention, the utility platform 42 stays positioned outside the stage area, and the utility platform tracks 422 are positioned vertically and adjacent to the outside of one of the plurality of sidewalls 20 so that the utility platform 42 may move vertically outside the sidewall. In an alternate embodiment of the present invention, the utility platform 42 does not have wheels or tracks and is affixed to one of the plurality of sidewall 20, either on the inside or outside of the stage 2. In the embodiment where the utility platform 42 is outside of the stage 2 and affixed to the sidewall closer to the truck cab, the truck must employ a cut-away truck cab to make room for the utility platform 42 when the stage 2 is in the lowered position. In the preferred embodiment of the present invention, the stage 2 comprises more than one utility platform 42, with at least one additional utility platform 42 being positioned at the front of the stage and being able to extend out from the stage in the direction of the audience for added stage or technical support space.

The method of operation of the present invention is as follows. The lift truck 1 is driven to and parked at the location where the performance is desired to be held. The lift truck 1 is then stabilized by engaging the plurality of stabilizing feet 14 with the ground and one or more doors are opened, depending on the performance or other conditions. The performance is prepared by setting up all necessary audio-visual, lighting and other performance equipment. In one embodiment of the invention, if performers are used, the performers are secured to the stage 2 with safety harnesses if desired. The stage 2 is then raised to the desired height using the lifting mechanism 10 and the performance is carried out. The reverse of the previous steps is then implemented. The stage 2 is lowered; the performers are removed from their safety harnesses if performers are used and if safety harnesses are used. The audio-visual, lighting and other performance presentation equipment is then removed, the plurality of stabilizing feet 14 are disengaged from the ground, and the lift truck 1 is driven away from the performance location.

Although the invention has been explained in relation to its preferred embodiment, it is to be understood that many other possible modifications and variations can be made without departing from the spirit and scope of the invention as hereinafter claimed.

What is claimed is:

1. A mobile truck-mounted performance stage on a hydraulic lift comprises,
    a lift truck;
    a stage;
    the lift truck comprises a lifting mechanism, a truck frame, a lift support frame, and a plurality of stabilizing feet;
    the lift truck being mobile;
    the stage comprises a stage platform, a roof, a plurality of sidewalls, a plurality of supports, a plurality of doors, a plurality of door operation mechanisms, a plurality of lighting trusses, a digital display, and a utility platform;
    the plurality of sidewalls being positioned atop the stage platform;
    the plurality of supports being positioned between the plurality of sidewalls and the roof;
    the roof being positioned atop the plurality of supports;
    the plurality of sidewalls comprises a first sidewall, a second sidewall, and a back sidewall;
    the first sidewall and the second sidewall being positioned opposite each other;
    the plurality of doors comprises a front door, a back door, a first side door and a second side door;
    the front door and the back door being positioned opposite each other;
    the first side door and the second side door being positioned opposite each other;
    the plurality of door operating mechanisms comprises a front door operating mechanism, a back door operating mechanism, a first side door operating mechanism and a second side door operating mechanism;
    the front door being operatively coupled to the front door operating mechanism;
    the back door being operatively coupled to the back door operating mechanism;
    the first side door being operatively coupled to the first side door operating mechanism; and
    the second side door being operatively coupled to the second side door operating mechanism.

2. The mobile truck-mounted performance stage on a hydraulic lift as claimed in claim 1 comprises,
    the plurality of stabilizing feet being positioned under the truck frame;
    the plurality of stabilizing feet being connected to the truck frame;
    the lift support frame being positioned adjacent the truck frame opposite the plurality of stabilizing feet;
    the lifting mechanism being positioned between the lift support frame and the stage; and
    the lifting mechanism being connected to the truck frame by the lift support frame.

3. The mobile truck-mounted performance stage on a hydraulic lift as claimed in claim 1 comprises,
    the lifting mechanism comprises a hydraulic scissor lift;
    the hydraulic scissor lift comprises a first set of lift wheels, a second set of lift wheels, a plurality of lift axles, and a hydraulic extension mechanism;
    each of the plurality of lift axles being oriented parallel to each other;
    the plurality of lift axles comprises a first lower lift axle, a second lower lift axle, a first upper lift axle, a second upper lift axle, and a midpoint lift axle;
    the first lower lift axle and the first upper lift axle being positioned opposite each other;
    the second lower lift axle and the second upper lift axle being positioned opposite each other;
    the first lower lift axle and the second lower lift axle being positioned opposite each other; and
    the first upper axle and the second upper lift axle being positioned opposite each other.

4. The mobile truck-mounted performance stage on a hydraulic lift as claimed in claim 3 comprises,
    the first lower set of lift wheels being rotatably connected to the first lower lift axle;
    the second lower set of lift wheels being rotatably connected to the second lower lift axle;
    the first lower lift axle and the second lower lift axle being positioned adjacent to the lift support frame;
    the first upper set of lift wheels being rotatably connected to the first upper lift axle;
    the second upper set of lift wheels being rotatably connected to the second upper lift axle; and
    the first upper lift axle and the second upper lift axle being positioned adjacent to the stage platform.

5. The mobile truck-mounted performance stage on a hydraulic lift as claimed in claim 1 comprises,
    each of the plurality of sidewalls being perpendicularly attached to the stage platform;

the plurality of supports being attached to the plurality of sidewalls opposite the stage platform; and the roof being connected to each of the plurality of supports opposite the plurality of sidewalls.

6. The mobile truck-mounted performance stage on a hydraulic lift as claimed in claim 1 comprises, the front door and the back door each comprise a roll-up door;

the front door operating mechanism and the back door operating mechanism each comprise a roll-up door holder;

the roll-up door holder of the first roll-up door and the roll-up door holder of the second door being positioned adjacent to the roof;

the roll-up door holder of the first roll-up door being rotatively engaged to the first roll-up door; and the roll-up door holder of the second roll-up door being rotatively engaged to the second roll-up door.

7. The mobile truck-mounted performance stage on a hydraulic lift as claimed in claim 1 comprises, the first side door and the second side door each comprise a plurality of panel sections;

the first side door operating mechanism and the second door operating mechanism each comprise a plurality of door tracks;

each of the plurality of panel sections comprises a plurality of track protrusions and a plurality of door wheels;

the door wheels being connected to the panel sections by the track protrusions; and the door wheels being positioned within the door tracks.

8. The mobile truck-mounted performance stage on a hydraulic lift as claimed in claim 1 comprises, the first side door and the second side door each comprise a hinge door; and the first side door operating mechanism and the second door operating mechanism each comprise a plurality of hinges.

9. The mobile truck-mounted performance stage on a hydraulic lift as claimed in claim comprises, the plurality of lighting trusses comprises a plurality of side trusses and a plurality of top trusses;

the plurality of side trusses being positioned adjacent to the plurality of supports;

the plurality of side trusses being oriented parallel to the plurality of supports;

the plurality of top trusses being positioned adjacent to the roof;

the plurality of top trusses comprises a front truss, a back truss, a first side truss, and a second side truss;

the front truss and the back truss being positioned opposite each other;

the front truss and the back truss both being oriented parallel to the back sidewall;

the left truss and the right truss being positioned opposite each other; and the left truss and the right truss both being positioned parallel to the first sidewall and to the second sidewall.

10. The mobile truck-mounted performance stage on a hydraulic lift as claimed in claim 1 comprises, the digital display comprises a video display system;

the video display system being positioned proximate to the rear truss;

the video display system being detachably mounted to the rear truss; and the video display system being oriented parallel to the back sidewall.

11. The mobile truck-mounted performance stage on a hydraulic lift as claimed in claim 1 comprises, the utility platform comprises a plurality of utility platform tracks;

the utility platform being connected adjacent to the first sidewall opposite the stage platform; and the utility platform being adjustably positioned through the plurality of utility platform tracks.

12. A mobile truck-mounted performance stage on a hydraulic lift comprises, a lift truck;

a stage;

the lift truck comprises a lifting mechanism, a truck frame, a lift support frame, and a plurality of stabilizing feet;

the lift truck being mobile;

the stage comprises a stage platform, a roof, a plurality of sidewalls, a plurality of supports, a plurality of doors, a plurality of door operation mechanisms, a plurality of lighting trusses, a digital display, and a utility platform;

the plurality of sidewalls being positioned atop the stage platform;

the plurality of supports being positioned between the plurality of sidewalls and the roof;

the roof being positioned atop the plurality of supports;

the plurality of sidewalls comprises a first sidewall, a second sidewall, and a back sidewall;

the first sidewall and the second sidewall being positioned opposite each other;

each of the plurality of sidewalls being perpendicularly attached to the stage platform;

the plurality of supports being attached to the plurality of sidewalls opposite the stage platform;

the roof being connected to each of the plurality of supports opposite the plurality of sidewalls;

the plurality of lighting trusses comprises a plurality of side trusses and a plurality of top trusses;

the plurality of side trusses being positioned adjacent to the plurality of supports;

the plurality of side trusses being oriented parallel to the plurality of supports;

the plurality of top trusses being positioned adjacent to the roof;

the plurality of top trusses comprises a front truss, a back truss, a first side truss, and a second side truss;

the front truss and the back truss being positioned opposite each other;

the front truss and the back truss both being oriented parallel to the back sidewall;

the left truss and the right truss being positioned opposite each other; and the left truss and the right truss both being positioned parallel to the first sidewall and to the second sidewall.

13. The mobile truck-mounted performance stage on a hydraulic lift as claimed in claim 12 comprises, the plurality of doors comprises a front door, a back door, a first side door and a second side door;

the front door and the back door being positioned opposite each other;

the first side door and the second side door being positioned opposite each other;

the plurality of door operating mechanisms comprises a front door operating mechanism, a back door operating mechanism, a first side door operating mechanism and a second side door operating mechanism;

the front door being operatively coupled to the front door operating mechanism;

the back door being operatively coupled to the back door operating mechanism;

the first side door being operatively coupled to the first side door operating mechanism; and the second side door being operatively coupled to the second side door operating mechanism.

14. The mobile truck-mounted performance stage on a hydraulic lift as claimed in claim 13 comprises, the front door and the back door each comprise a roll-up door;

the front door operating mechanism and the back door operating mechanism each comprise a roll-up door holder;

the roll-up door holder of the first roll-up door and the roll-up door holder of the second door being positioned adjacent to the roof;

the roll-up door holder of the first roll-up door being rotatively engaged to the first roll-up door; and the roll-up door holder of the second roll-up door being rotatively engaged to the second roll-up door.

15. The mobile truck-mounted performance stage on a hydraulic lift as claimed in claim 13 comprises, the first side door and the second side door each comprise a plurality of panel sections;

the first side door operating mechanism and the second door operating mechanism each comprise a plurality of door tracks;

each of the plurality of panel sections comprises a plurality of track protrusions and a plurality of door wheels;

the door wheels being connected to the panel sections by the track protrusions; and the door wheels being positioned within the door tracks.

16. The mobile truck-mounted performance stage on a hydraulic lift as claimed in claim 13 comprises, the first side door and the second side door each comprise a hinge door; and the first side door operating mechanism and the second door operating mechanism each comprise a plurality of hinges.

17. The mobile truck-mounted performance stage on a hydraulic lift as claimed in claim 12 comprises, the lifting mechanism comprises a hydraulic scissor lift;

the hydraulic scissor lift comprises a first set of lift wheels, a second set of lift wheels, a plurality of lift axles, and a hydraulic extension mechanism;

each of the plurality of lift axles being oriented parallel to each other;

the plurality of lift axles comprises a first lower lift axle, a second lower lift axle, a first upper lift axle, a second upper lift axle, and a midpoint lift axle;

the first lower lift axle and the first upper lift axle being positioned opposite each other;

the second lower lift axle and the second upper lift axle being positioned opposite each other;

the first lower lift axle and the second lower lift axle being positioned opposite each other; and the first upper axle and the second upper lift axle being positioned opposite each other.

18. The mobile truck-mounted performance stage on a hydraulic lift as claimed in claim 17 comprises, the first lower set of lift wheels being rotatably connected to the first lower lift axle;

the second lower set of lift wheels being rotatably connected to the second lower lift axle;

the first lower lift axle and the second lower lift axle being positioned adjacent to the lift support frame;

the first upper set of lift wheels being rotatably connected to the first upper lift axle;

the second upper set of lift wheels being rotatably connected to the second upper lift axle; and the first upper lift axle and the second upper lift axle being positioned adjacent to the stage platform.

19. The mobile truck-mounted performance stage on a hydraulic lift as claimed in claim 17 comprises, the plurality of stabilizing feet being positioned under the truck frame;

the plurality of stabilizing feet being connected to the truck frame;

the lift support frame being positioned adjacent the truck frame opposite the plurality of stabilizing feet;

the lifting mechanism being positioned between the lift support frame and the stage;

the lifting mechanism being connected to the truck frame by the lift support frame;

the digital display comprises a video display system;

the video display system being positioned proximate to the rear truss;

the video display system being detachably mounted to the rear truss; and the video display system being oriented parallel to the back sidewall;

the utility platform comprises a plurality of utility platform tracks;

the utility platform being connected adjacent to the first sidewall opposite the stage platform; and the utility platform being adjustably positioned through the plurality of utility platform tracks.

\* \* \* \* \*